June 2, 1970   A. W. BLACKBURN   3,515,361
CONTROL OF AIRCRAFT BY DEFLECTION OF PROPULSION GASES
Filed Sept. 12, 1966   3 Sheets-Sheet 2

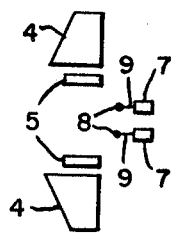
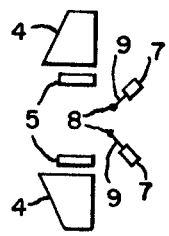
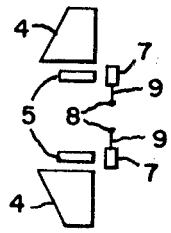
FIG. 3     FIG. 4     FIG. 5
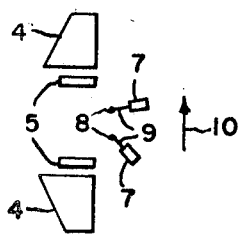
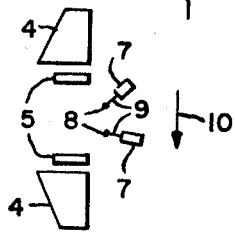
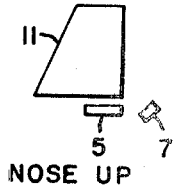
FIG. 6     FIG. 7
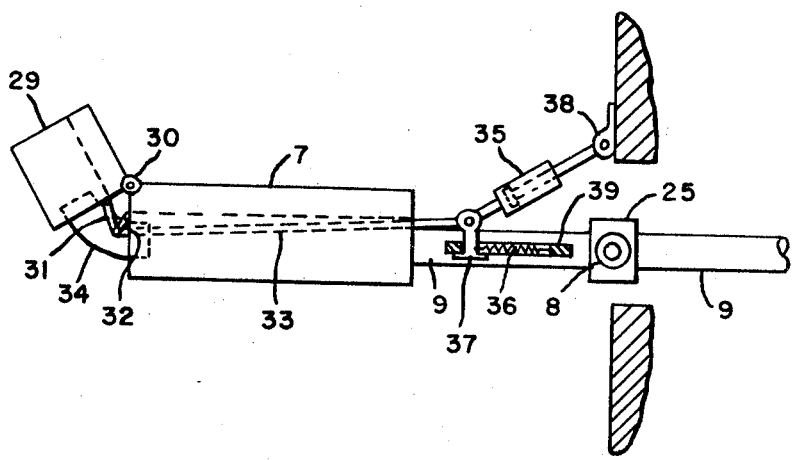
FIG. 8

United States Patent Office 3,515,361
Patented June 2, 1970

3,515,361
CONTROL OF AIRCRAFT BY DEFLECTION OF PROPULSION GASES
Albert W. Blackburn, Huntington, N.Y.
(1300 Woodside Drive, McLean, Va. 22101)
Filed Sept. 12, 1966, Ser. No. 578,582
Int. Cl. B64c 15/06
U.S. Cl. 244—52
22 Claims

ABSTRACT OF THE DISCLOSURE

A system for improving the flight control of an aircraft including a deflector for deflecting propulsion gases in multiple directions and controls for the deflector, affording the pilot an expanded range of maneuverability of the aircraft in flight, in the landing maneuver, and in deep stall, including means to defend against hostile heat seeking missiles.

---

My invention is a system for deflecting the propulsion gases of an aircraft engine to solve a number of pressing problems of present aircraft. While applicable to aircraft with other types of engines, it is particularly applicable to aircraft powered by jet engines and will be described in that context.

The thinking in the past on the use of exhaust gases of jet engines for aircraft control has been far too limited in scope. In the present state of jet aircraft technology, it has been recognized that the exhaust gases of the jet engines may be used for braking the forward motion of the aircraft after it has landed. Thus, conventional engines incorporate so called thrust reversers which are brought into operation after the aircraft has landed and cause the exhaust gases to flow forward instead of backward. This forward flow acts as a brake to slow the aircraft in a manner much superior to old-fashioned wheel brakes. However, such thrust reversers operate at the expense of engine efficiency during flight. That is to say that during normal flight the engines deliver less power than would be possible if they were not encumbered with the thrust reverser mechanisms. This is because the physical presence of the thrust reverser mechanisms in the engines causes leakage and internal drag. Moreover, partly as a consequence of this preoccupation with the combined propulsion and thrust reverser functions as an integrated package, the thrust reversers found on present jet aircraft tend to be heavy, complex and expensive.

On the other hand, it has been thought that except in very limited situations the deflection of exhaust gases from jet engines for deceleration of the aircraft during flight is not feasible because the deflected gases impair aircraft control and stability, particularly at low speeds, for the reason that such deflection disrupts or modifies the flow of air over the aircraft control surfaces such as the horizontal stabilizers. Yet if properly used in accordance with my invention, these deflected gases could be used to great advantage as a positive control power obtained by differential deflection of jet thrust. Thus they would afford the pilot a mechanism for more accurate maneuvering of his aircraft throughout the entire speed and altitude range in which the aircraft is capable of operating. A dramatic demonstration of their utility in this respect lies in the fact that my invention gives the pilot a means to recover from the exceedingly dangerous situation of a deep stall. Another lies in the greatly improved maneuverability afforded the pilot in the accuracy with which he can select his touchdown point in the landing maneuver with no variation in touchdown speed. Still another lies in the combat situation where an attacking enemy aircraft has the advantage and is closing from the rear. There the ability of the intended victim to decelerate more effectively than the enemy, thus forcing the enemy to overshoot, may well prove to be the narrow margin of superiority necessary for immediate survival and subsequent reversal of the advantage.

Another problem is the defense of the aircraft against enemy missiles which contain guiding instruments sensitive to infra red radiation of the exhaust portions of the jet engines of the victim craft. Except for the case of a very fast missile versus a relatively slow aircraft, such missiles are constrained to conduct the final phase of their attack in a narrow cone extending rearward of the jet engines, from which position they seek the hot exhaust outlets of the engines. If the hot gases could be diverted and/or the hot portions of the engines hidden from the missile's field of view, the missile would in many cases be misled enough to cause it to miss its target. Thus the first order of priority for defeating such missiles is the concealing of infra red radiation in the exhaust portions of the jet engines. This should be done without serious loss of other aircraft performance characteristics.

Important to the control of an aircraft during flight is the control of its pitch which is the angle of its nose to tail axis, X—X FIG. 1a, to the earth (horizontal) when in wings level flight. If that angle is such that the nose is too high with respect to the tail, the aircraft may go into a deep stall and crash, unless the pilot can bring the nose down to proper position (proper pitch) in time to prevent deep stall. Similarly, if the nose is too low with respect to the tail, the pilot must bring the nose up to proper position. In both of these situations, the pilot, in the conventional practice, attempts to correct the pitch by use of the horizontal stabilizer which by reaction with the atmospheric air flowing past it pushes the tail up or down with respect to the nose, as he desires and to the extent necessary to achieve the desired pitch attitude. Occasionally this can not be done because aerodynamic conditions are such that the horizontal stabilizer can no longer control the aircraft to bring about proper pitch, and disaster results. In a critical situation such as this, my invention would produce a positive force for pushing the tail up or down and would thus augment the action of the horizontal stabilizer. This is particularly important in the case of the deep stall because then there is no way to restore control to the stabilizer. Preferably, all of this is done automatically through manipulation of the conventional cockpit controls as will be explained.

In flight, pilot judgement is made not by pitch alone but by pitch rate which is the rate of change of pitch from moment to moment. Pitch rate can easily be sensed by the pilot's eye or other senses. The pilot responds to this sensing by manually moving his control column (the "stick") which is the mechanism for controlling the horizontal stabilizer. In more expensive aircraft, the control column controls a pitch rate transducer which produces an electrical or mechanical signal proportional to the pitch rate which the pilot desires and this can be used to actuate mechanism designed to set the horizonal stabilizer at the position needed to produce the pitch rate which the pilot desires.

However, as already indicated for the case of the deep stall, aerodynamic conditions may be such that the horizontal stabilizer will fail to bring the aircraft to the proper pitch attitude even though the pilot has manipulated the control column properly. The pilot then needs help desperately; he is in an emergency. My invention provides that help. After waiting for a short interval to be sure that the pilot's command to the horizontal stabilizer cannot be met by them, the invention automatically senses that the horizontal stabilizer has failed to produce the result desired by the pilot and then automatically goes into emergency action to bring about the correct pitch. This is done by mechanism which measure both the pitch rate commanded by the pilot and the pitch rate actually achieved by the aircraft. With these two measurements, the invention then calculates the error in pitch rate and produces an error signal proportional to the pitch rate. This error signal is then used to control mechanisms which deflect propulsion gases in such a way as to correct the pitch, for example, by pushing up or down on the tail to the extent necessary.

Therefore, the pilot is in control through the horizontal stabilizer during all normal flight. It is only when he is in difficulty that the control augmentation of the invention comes into play.

Another problem is yaw which is the angle of the nose to tail, X—X, axis of the aircraft to the direction of flight. Normally, the pilot commands zero yaw angle, that is, he wishes the nose to tail axis of the aricraft to be parallel to the direction of flight. In a manner similar to the handling of the pitch problem, my invention provides automatic correction of the yaw angle.

As will be seen from the description of practical mechanisms to follow later, the mechanisms to accomplish all of the foregoing results will also perform the job of braking the aircraft after it has landed.

The manner of coordinating the solution of all the foregoing problems has not been foreseen and it is the main object of my invention to exploit the full usefulness of propulsion gases by providing a simple mechanism for the deflection thereof to solve all of these problems in a simple manner.

More specifically, it is an object of the invention to provide a system and mechanism for performing selectively one or more of the following functions in an aircraft:

Augmentation of pitch rate control, preferably only when normal aerodynamic pitch rate control by the horizontal stabilizer is ineffective, and preferably automatically.

Thrust reversal for deceleration either in flight or in landing.

Augmentation of aircraft yaw control.

Suppression of infra red radiation or concealment thereof.

The invention will be better understood from the following description and drawings of a preferred embodiment.

In the drawings:

FIGS. 3 to 7 are schematics to illustrate the manner in which the deflector mechanism performs the various functions called for in the above stated objects of the invention.

FIG. is a view of mechanisms attached to the outer ends of the deflectors to increase the efficiency of the thrust reversing action and the linkages for operating the same.

Figure 1:
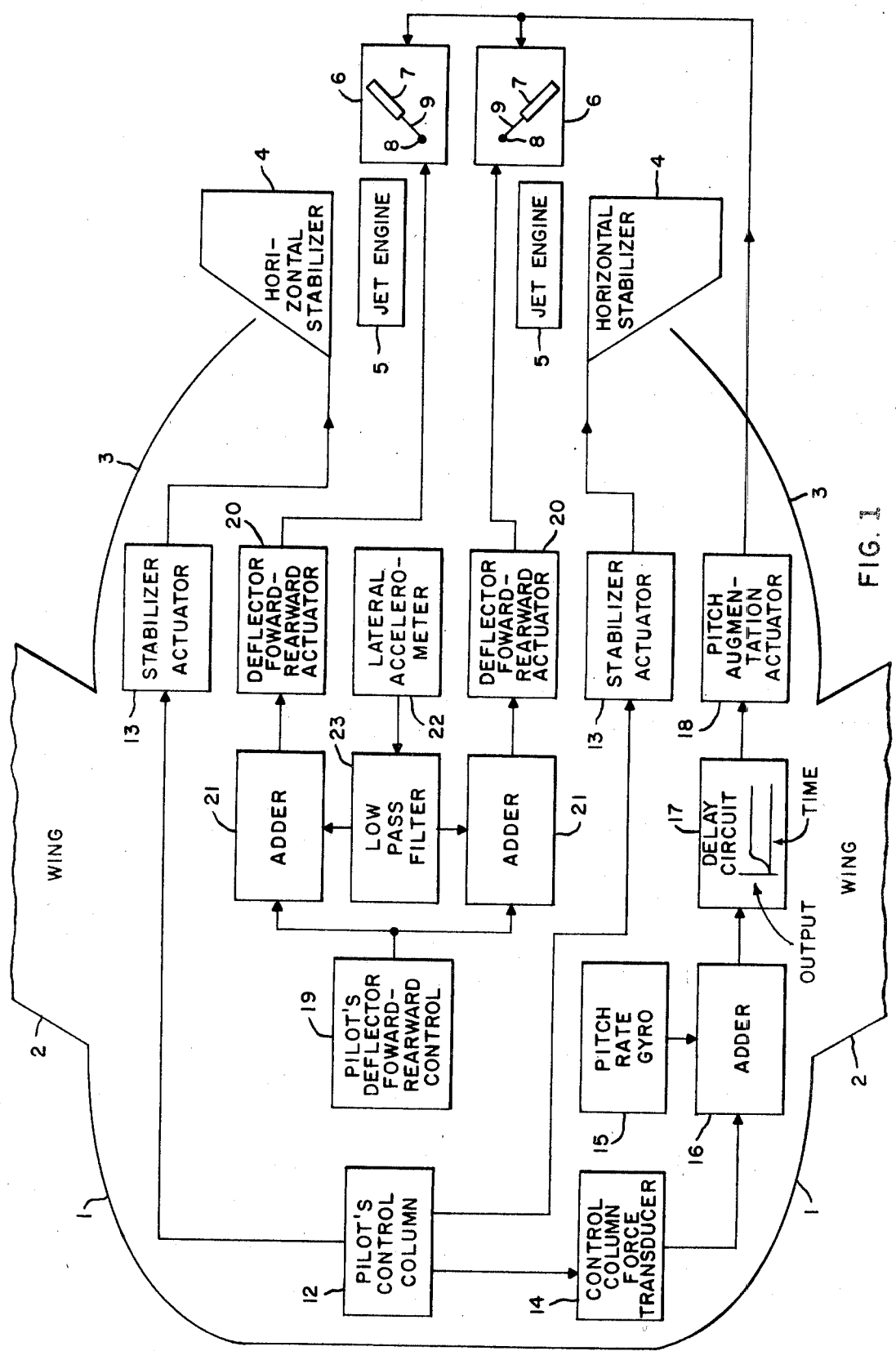
FIG. 1 is a schematic view of an aircraft showing the general plan of the invention.
Figure 1A:
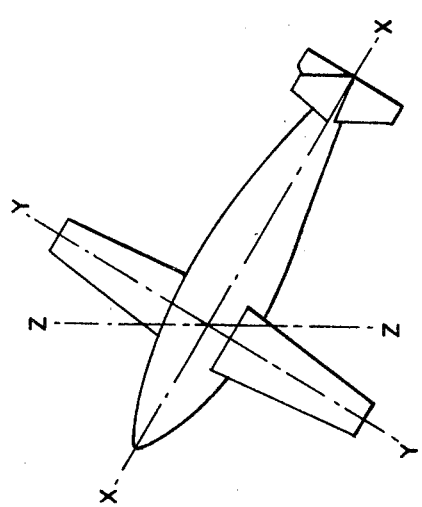
FIG. 1a shows aircraft axes referred to herein. (X—X being through the nose and tail, Y—Y along the wings, and Z—Z perpendicular to X—X and Y—Y)

Referring to FIG. 1, there is illustrated a top view of an aircraft having conventional nose portion 1 containing a pilot's cockpit and controls, wings 2, fuselage 3, horizontal stabilizer 4 and jet engines 5. Deflector mechanisms 6, mounted rearward of jet engines 5, will be better understood by reference to FIG. 2 as to construction, and FIGS. 3 to 7 as to function. Essentially, these comprise deflectors 7 which are so mounted that they may be rotated about axes 8 which are parallel to the Z—Z axis of the aircraft, FIG. 1a, and also about the axes of their shafts 9, which are in the X—X, Y—Y plane. Therefore they may be positioned in any of the following positions as desired by the pilot:

(1) Retracted completely from the path of the exhaust gases of jet engines 5 as shown in FIG. 3, in which position they play no role in the control of the aircraft. In this position, their vane-like shape conforms as nearly as practical to the mold lines of the fuselage of the aircraft.

(2) Rotated forward about axes 8 to some intermediate position shown in FIG. 4 in which they are effective to conceal the hot exhaust portions of engines 5 from infra red seeking hostile missiles. In this position the vertical faces of the deflectors remain parallel to the Z—Z axis of the aircraft, FIG. 1a, and in the position they do not cause any substantial reduction of the forward thrust of engines 5.

(3) Rotated forward to the position shown in FIG. 5 in which they become effective thrust reversers for the engines 5 for deceleration in flight or for normal braking on landing. In this position their vertical faces remain parallel to the Z—Z axis of the aircraft.

(4) Differentially rotated forward about axes 8 as shown in FIG. 6 so that one of the pair of deflectors 7 is farther forward than the other. In this situation, the one farther forward will produce more lateral thrust than the other so that there is a net lateral thrust for yaw angle correction. As indicated by the arrows 10 of the two portions of FIG. 6, such a force may be produced in either direction as desired depending on the difference in the angles of deflectors 7 with respect to the X—X axis, FIG. 1a, of the aircraft, the force being derived from the impingement of the exhaust gases of engines 5 on the deflectors 7. The magnitude of the net lateral force can be controlled by the degree to which one of the deflectors 7 is rotated farther forward than the other, and the direction of the net lateral force can be controlled by selection of one or the other of the deflectors 7 for the more forward position. In these positions their vertical faces are again parallel to the Z—Z axis of the aircraft.

(5) Rotated about their shafts 9 so that their vertical faces deflect the exhaust gases of engines 5 either upward or downward with respect to the Z—Z of axis of the aircraft. This creates a force for pitch control augmentation i.e. a force to permit the pilot to push the nose up or down as he desires. It will be understood that FIG. 7 which illustrates this, is a schematic view of the tail structure from the side of the aircraft whereas FIGS. 1 and 3 to 6 are from the top or bottom. The numeral 11 designates the usual vertical stabilizer.

The mechanical structure of FIG. 2 necessary to the accomplishment of the foregoing actions will be explained later. Returning to FIG. 1 for the controls of these actions, the system includes the following further elements.

CONVENTIONAL FLIGHT

First there is the conventional pilot's control column 12, colloquially called the "stick." This, as in conventional practice, controls horizontal stabilizers 4 through conventional horizontal stabilizer actuators 13. It also controls rudder 11 (FIG. 7) in the usual manner. Thus normal conventional control by the horizontal and vertical stabilizers is retained for all flight. Thus the pilot is able to rely on all the tools of the past for ordinary flight situations. Yet for the special problems heretofore outlined he may bring into play the additional controls such as the pitch augmentation control, thrust reversal for deceleration in combat or in landing, or the infra red concealment from hostile missiles.

PITCH AUGMENTATION CONTROL SYSTEM

For additional pitch control there is provided the following elements to permit the pilot to augment his control of pitch beyond that ordinarily obtained by use of the horizontal stabilizer 4. There is provided a control column force transducer 14 of conventional construction which automatically measures the pitch rate which the pilot desires as indicated by the force he exerts on the control column 12. At the same time, a conventional pitch rate gyro measures the actual pitch rate of the aircraft and produces a signal indicative thereof. The signals produced by the control column force transducer 14 and the pitch rate gyro 15 are fed to the conventional adder 16 which compares the two signals to determine whether there is any error between the pitch rate commanded by the pilot and the pitch rate actually attained by the aircraft. If there is such an error and it has persisted for a dangerous long time, the system will react to bring deflectors 7 into pitch control action. If there is such an error signal, adder 16 will send it on to delay circuit 17. Circuits of the type of delay circuit 17 are well known. They simply delay their action for a sufficient interval of time after the receipt of an error signal from adder 16 to to insure that only errors which persist for a substantial period of time will actuate the pitch augmentation actuator 18. This action is indicated by the well known curve in the drawing of delay circuit 17. All this means that the pilot will normally be in control through horizontal stabilizers 4 and that it is only after an error has persisted long enough to indicate that he is unable to correct it with the horizontal stabilizer that the pitch augmentation action of deflectors 7 will come into play, their action will be understood from FIG. 7. With the deflectors 7 in the position shown in the left hand figure of FIG. 7, the jet engines will exert a force on the deflectors 7 in the upward direction to bring the nose down and the tail up. In the right hand figure this force will be in the opposite direction and so will bring the nose up and the tail down.

DEFECTOR FORWARD REARWARD CONTROL

To permit the pilot to rotate the deflectors 7 forward or rearward about the axes 8 as shown in FIGS. 3 to 6, there is provided in the cockpit, as on the throttle, a pilot's deflector forward-rearward control 19 which by suitable electrical signal actuates conventional hydraulic deflector forward-rearward actuators 20 connected to deflector mechanisms 6. For the yaw control illustrated in FIG. 6, actuators 20 are caused to be actuated differentially by the following means. The signal from forward-rearward control 19 is passed to actuators 20 through conventional adders 21. A conventional lateral accelerometer 22 produces a signal which is a measure of yaw angle actually existing during flight and feeds that signal to a conventional low pass filter 23 which filters out signals due to inconsequential variations in yaw angle so that only steady state persistent errors in yaw angle are effective to produce corrective action. The signal output from filter 23 is fed to adders 21 to add to one and subtract from the other of the signals coming to adders 21 from forward-rearward control 19. Thus there will be a differential actuation of actuators 20 to produce the situations shown in FIG. 6 as desired. If the desired zero yaw angle exists, accelerometer 22 will produce no signal and so there will be no differential action and deflectors 7 will be rotated forward to the same degree, i.e. they will be at equal angles to the X—X axis of the aircraft.

Figure 2:
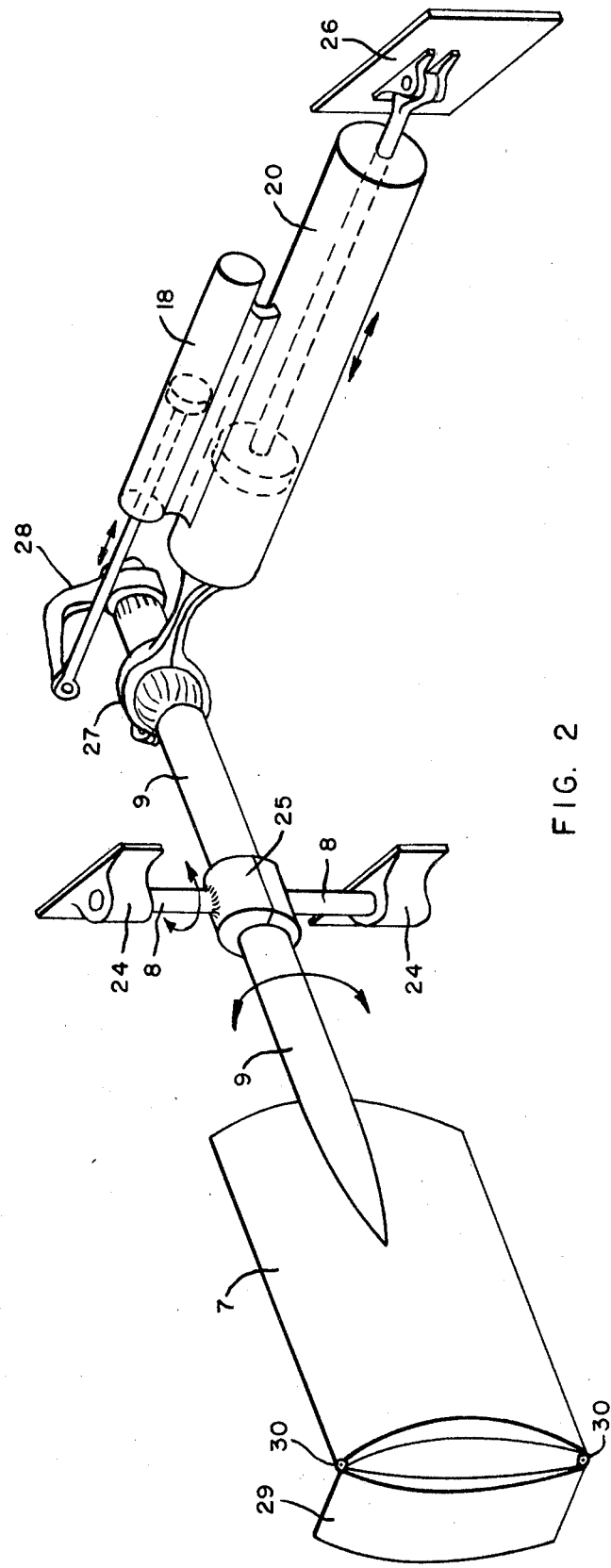
FIG. 2 is a view of the deflector mechanism.

Coming now to FIG. 2, the numerical designations used in FIGS. 1 and 3 through 7, are used in FIG. 2 to indicate corresponding mechanical parts. In FIG. 2, the deflector mechanism 6, actuators 18 and 20 for one side of the aircraft only are shown, i.e. the left hand side looking downward on FIG. 1, since it is obvious that the mechanisms 6 and actuators 18 and 20 are the same on both sides, being mirror images of each other.

It will be seen that the deflector 7 is mounted for rotation about two axes as indicated in FIGS. 3 to 7, i.e. rotation about the shaft 9 and the shaft 8. Shaft 9 provides for rotation about that shaft which in turn moves fore and aft about shaft 8 in the X—X Y—Y plane of the aircraft; shaft 8 is parallel to the Z—Z axis of the aircraft. Shaft 8 is journaled in members 24 fixed to the body of the aircraft. Shaft 9 is so journaled in thrust bearing 25 that it may rotate about but not slide longitudinally in bearing 25.

To control rotation of deflector 7 about shaft 8, the piston rod of the actuator 20 is secured to member 26 fixed to the body of the aircraft, while the cylinder of actuator 20 is attached to the ball joint 27 accommodates the rotary movement of shaft 9. To control rotation of deflector 7 about shaft 9, the cylinder of actuator 18 is affixed at one end to the cylinder of actuator 20 while the piston rod is attached to the arm 28 which is affixed to shaft 9. Both actuators 18 and 20 are conventional hydraulic members providing motion of their pistons in either direction. The manner in which the hydraulic fluid pressure is controlled by the electrical outputs of circuit 17 and adders 21 of FIG. 1 is well known.

When deflector 7 is in the position of FIG. 3 (thrust reverse) or that of FIG. 7 it is desirable that its cylindrical outer end be closed by a gate 29 to insure that when reverse thrust is being used the deflected gases will be directed forward for efficient reversal action; yet that the gate 29 be open so as to conform to and provide an extension of the deflector 7 during the infra red concealment mode of operation (FIG. 4) so that the deflector 7 with its smooth surface will present a minimum drag on the aircraft in this mode of operation. Mechanisms to cause gate 29 to behave in this manner may be of any suitable design and such a mechanism is shown in FIG. 8. Gate 29 is hinged to deflector 7 at hinges 30.

In FIG. 8 there is shown a linkage comprising link 31 rotatably linked to gate 29, link 32 rotatably linked to deflector 7 and rod 33 rotatably linked to both links 31 and 32 so that longitudinal motion of rod 33 will rotate gate 29 about hinges 30. A suitable flexible seal 34 attached to deflector 7 and slidable within gate 29 will close the gap between deflector 7 and gate 29 when it is rotated to the thrust reversal position. Rotation of the gate 29 is brought about by a suitable mechanism such as extensible link 35, spring 36 and slidable member 37. Member 37 is rotatably attached to link 35 and to rod 33. At its other end, link 35 is rotatably affixed to the frame of the aircraft at 38, and spring 36 is held within the slot of member 39 along which the slidable member 37 moves. Member 39 is attached to the shaft 9. It will thus be seen that when deflector 7 is rotated to the thrust reversal position of FIG. 5, spring 36 will push on member 37 and rod 33 to rotate gate 29 clockwise to a position at or near right angles to deflector 7. As deflector 7 is rotated to the FIG. 4 infra red mode position, link 35 will pull on rod 33 and member 37 against the tension of spring 36 to rotate gate 29 counterclockwise aligning it with deflector 7.

In order to further decrease infra red radiation and to permit one to build deflectors 7 of lighter metal, it will probably be desirable to provide for their cooling by air and/or fluid. This can readily be done with the construction shown in FIG. 2 by suitable conduits in the shafts 8 and/or 9 and in the deflector 7 itself.

The advantages which the system described in the foregoing text offers to the pilot are many. My system affords him a considerably broader range of maneuverability of the aircraft than is available in prior systems. As examples, consider the following problem situations which confront pilots.

As to the problem of landing—in present practice the pilot lands with forward thrust only; he has no reverse thrust available. It is essentially a gliding operation in which the only deceleration forces available to him are those of wind resistance which of course is negligible at the final low speed stages of his landing maneuver. This often leads to overshooting of his desired touchdown point or the final stopping point, and in any event requires a relatively low angle of approach which necessarily means that he must fly at relatively low altitude over lengthy approach paths to his airport. With my system he is afforded a positive reverse thrust which permits him to decelerate much more rapidly than with present techniques. This means that he may safely conduct his landing approach maneuver at much steeper angles and consequently greatly reduce low altitude maneuvering about the airport flight path. In addition, he has the possibility of correcting an incipient overshoot. For example, if he finds that he has miscalculated and approached at too high an altitude, he may apply reverse thrust to decelerate so that he may still arrive at his intended touchdown point at the proper speed. This is not possible with prior systems because, while the pilot may arrive at his intended touchdown point by diving, he will do so with excessive speed caused by the dive which may result in overshooting the runway altogether.

As to the deep stall problem—here the pilot has lost all control with present systems and is headed for disaster. With my system, the deflectors 7 (FIG. 7) automatically come into play to bring the nose down and rescue the situation.

As to the combat problem of outmaneuvering enemy aircraft and hostile infra red seeking missiles—here the pilot with an attacking enemy aircraft "on his tail" may suddenly move deflectors 7 into the thrust reverse position (FIG. 5) and decelerate so rapidly that the attacking aircraft will overshoot his target or at least miss his aim. If the attacker has overshot far enough, the pilot with my system may then become the attacker on the tail of the enemy and may close his thrust reverse (FIG. 3) so that he has full power to pursue the enemy. If the attack is from an infra red seeking missile, the pilot may put the deflectors 7 in the infra red position (FIG. 4) to conceal the hot exhaust of jet engines 5 from the infra red sensitive instruments of the hostile missile.

I claim:

1. In combination in an aircraft having a wing for aerodyanamic support, a pilot's control column, and a horizontal stabilizer actuated by the control column for pitch control of the aircraft, but which horizontal stabilizer may in some aerodynamic flight conditions such as deep stall or in the landing maneuver fail to bring about the pitch commanded by the pilot by use of the control column, the aircraft also having propulsion means for propelling gas rearward of the aircraft for propulsion of the aircraft:

deflector means for deflecting the gas so propelled from the propulsion means;
   and means for moving the deflector means selectably to any of the following positions: either to a position where it deflects no gas so that maximum power can be obtained from the propulsion means or to positions where it deflects gas to decelerate the aircraft, and/or to positions where it deflects gas above or below the X—X, Y—Y plane of the aircraft to augment the pitch control of the aircraft responsive to such failure of the horizontal stabilizer to bring about the pitch commanded by the pilot.

2. A combination as in claim 1 in which the means for moving the deflector means is also for moving the deflector means selectably to a position in which it conceals the propulsion means from hostile infra red sensitive missiles.

3. A combination as in claim 1 in which the means for moving the deflector means is also for moving the deflector means to a position in which it deflects the gas to correct yaw angle.

4. A combination as in claim 1 in which the means for moving the deflector means includes means for mount-the the deflector means for rotation about an axis parallel to the Z—Z axis of the aircraft for movement into and out of the path of the gas and for rotation about an axis in the X—X, Y—Y plane of the aircraft for deflecting the gas for augmentation of pitch control of the aircraft.

5. A combination as in claim 1 including automatic means for actuating said deflector means in its pitch augmentation mode automatically when said horizontal control surface fails to bring about the pitch rate desired by the pilot.

6. A combination as in claim 5 in which said automatic means includes means for delaying the action of the automatic means for a period of time to permit the pilot to bring about the desired pitch rate if he can do so with the control column and horizontal control surface.

7. A combination as in claim 5 in which said automatic means includes:

a sensor for producing a signal indicative of the pitch rate actually attained by the aircraft;
   a control column force transducer for producing a signal indicative of the pitch rate commanded by the pilot through the control column;
   and means responsive to said signals for producing an error signal indicative of the error between the pitch rate commanded by the pilot and the pitch rate actually attained by the aircraft;
   and means responsive to the error signal for moving the deflector means to a position where it deflects gas to augment the pitch control of the aircraft.

8. In combination in an aircraft:

propulsion means for thrusting gas rearward for propulsion of the aircraft which means radiates infra red radiation which may guide hostile infra red sensitive missiles approaching the aircraft normally through a narrow cone extending rearward from the rear of the aircraft;
   and propulsion gas deflection surfaces which can be positioned for concealing from such a missile approaching within the said narrow cone the infra red radiation emanating from the propulsion means, but which surfaces when so positioned do not detract substantially from the forward thrust of the propulsion means.

9. In combination in an aircraft having a wing for aerodynamic support, a pilot's control column, and a horizontal stabilizer actuated by the control column for pitch control of the aircraft, but which horizontal stabilizer may in some aerodynamic flight conditions such as deep stall or in the landing maneuver fail to bring about the pitch commanded by the pilot by use of the control column, the aircraft also having propulsion means for propelling gas rearward of the aircraft for propulsion of the aircraft:

a pair of deflector means for deflecting the gas so propelled from the propulsion means and mounted for rotation about a first axis parallel to the Z—Z axis of the aircraft and for rotation about a second axis in the X—X, Y—Y plane of the aircraft;
   means for rotating the deflector means selectably about their first axis to positions where they deflect no gas so that maximum power can be obtained from the propulsion means, or to positions where they deflect gas to decelerate the aircraft;
   means for causing the latter rotations to be performed differentially so that that one deflector means is rotated more than the other whereby their different angles to the X—X axis produce a net yaw correction force;
   and means for rotating the deflector means selectably about their second axis to deflect gas above or below the X—X, Y—Y plane of the aircraft to augment pitch control of the aircraft.

10. A combination as in claim 9 in which the means for rotating the deflector means selectably about their first axis is also for moving the deflector means to positions in which they conceal the heated portion of the propulsion means from hostile infra red sensitive missiles.

11. A combination as in claim 9 including automatic means for actuating said deflector means in their pitch augmentation mode automatically when said horizontal stabilizer fails to bring about the pitch rate desired by the pilot.

12. A combination as in claim 11 in which said automatic means includes means for delaying the action of the automatic means for a period of time to permit the pilot to bring about the desired pitch rate if he can do so with the control column and horizontal stabilizer.

13. A combination as in claim 11 in which said automatic means includes:
   a sensor for producing a signal indicative of the pitch rate actually attained by the aircraft;
   a control column force transducer for producing a signal indicative of the pitch rate commanded by the pilot through the control column;
   and means responsive to said signals for producing an error signal indicative of the error between the pitch rate commanded by the pilot and the pitch rate actually attained by the aircraft;
   and means responsive to the error signal for rotating the deflector means about their second axis.

14. In combination in an aircraft having a wing for aerodynamic support, a pilot's control column, and a horizontal stabilizer actuated by the control column for pitch control of the aircraft, but which horizontal stabilizer may in some areodynamic flight conditions such as deep stall or in the landing maneuver fail to bring about the pitch commanded by the pilot by use of the control column, the aircraft also having propulsion means for propelling gas rearward of the aircraft for propulsion of the aircraft:
   deflector means for deflecting the gas so propelled from the propulsion means;
   means for moving the deflector means to a position wherein it deflects the gas forward of the aircraft to control the forward deceleration thereof;
   and means responsive to such failure of the horizontal stabilizer to bring about the pitch commanded by the pilot for rotating the deflector means about an axis parallel to the X—X, Y—Y plane of the aircraft to variably direct such deflection of the gas above or below the X—X, Y—Y plane of the aircraft to augment pitch control of the aircraft.

15. A combinaiton as in claim 14, in which the means for moving the deflector means and the means for rotating the deflector means comprise means for so mounting the deflector means that it may be selectably rotated about an axis parallel to the Z—Z axis of the aircraft and an axis in the X—X, Y—Y plane of the aircraft.

16. A combination as in claim 14, in which its last mentioned means includes automatic means for so rotating said deflector means automatically when said horizontal control surface fails to bring about the pitch rate commanded by the pilot through the control column.

17. A combination as in claim 16, in which said automatic means includes means for delaying the action of the automatic means for a period of time to permit the pilot to bring about the desired pitch if he can do so with the control column and horizontal control surface.

18. A combination as in claim 16, in which said automatic means includes:
   a sensor for producing a signal indicative of the pitch rate actually attained by the aircraft;
   a control column force transducer for producing a signal indicative of the pitch rate commanded by the pilot through the control column;
   and means responsive to said signals for producing an error signal indicative of the error between the pitch rate commanded by the pilot and the pitch rate actually attained by the aircraft;
   and means responsive to the error signal for so rotating the deflector means to a position where it so deflects the gas to augment the pitch control of the aircraft.

19. A combination as in claim 14, in which the means for moving the deflector means is also for moving the deflector means to a position in which it deflects the gas differentially to correct yaw angle.

20. The method of controlling an aircraft having a wing for aerodynamic support, a pilot's control column, and a horizontal stabilizer actuated by the control column for pitch control of the aircraft, but which horizontal stabilizer may in some aerodynamic flight conditions such as deep stall or in the landing maneuver fail to bring about the pitch commanded by the pilot by use of the control column, the aircraft also having propulsion means for propelling gas rearward of the aircraft for propulsion of the aircraft:
   deflecting the gas of the propulsion means forward of the aircraft to control the longitudinal deceleration of the aircraft;
   and varying the direction of such deflection above or below the X—X, Y—Y plane of the aircraft to augment pitch control of the aircraft when the horizontal stabilizer so fails to bring about the pitch commanded by the pilot.

21. The method as in claim 20 including: automatically varying such direction.

22. The method as in claim 21 including: delaying the automatic varying of such direction for a period of time to permit the pilot to bring about the desired pitch with the control column and horizontal control surface if he can do so and then automatically varying such direction if the pilot can not do so.

References Cited

UNITED STATES PATENTS 2,738,147    3/1956    Leech _____ 244—52

MILTON BUCHLER, Primary Examiner

J. PITTENGER, Assistant Examiner

U.S. Cl. X.R.

239—265.29; 244—76, 110